No. 684,928.　　　　　　　　　　　　　Patented Oct. 22, 1901.
J. W. FLETCHER.
NUT LOCK.
(Application filed Sept. 25, 1900.)
(No Model.)
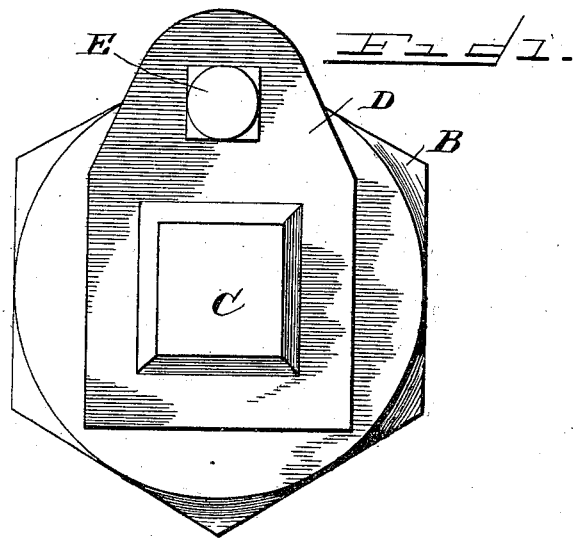
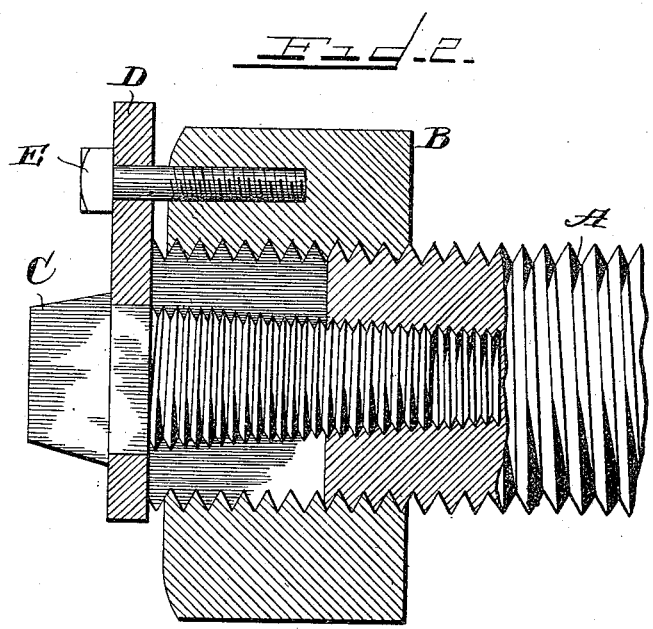
Witnesses:
Inventor:
John W. Fletcher
By Charles Justice
Atty

UNITED STATES PATENT OFFICE.

JOHN W. FLETCHER, OF CHICAGO, ILLINOIS, ASSIGNOR OF ONE-HALF TO NAFTALY NEWMAN, OF CHICAGO, ILLINOIS.

NUT-LOCK.

SPECIFICATION forming part of Letters Patent No. 684,928, dated October 22, 1901.

Application filed September 25, 1900. Serial No. 31,109. (No model.)

*To all whom it may concern:*

Be it known that I, JOHN W. FLETCHER, a citizen of the United States, and a resident of Chicago, in the county of Cook and State of Illinois, have invented certain new and useful Improvements in Nut-Locks; and I hereby declare that the following is a full, clear, and exact description thereof, reference being had to the accompanying drawings, and to the letters of reference marked thereon, which form a part of this specification.

This invention relates to improvements in nut-locks, and contemplates means for fastening the nut on a bolt without the use of springs.

The invention consists in the matters hereinafter described, and more fully pointed out and defined in the appended claims.

In the drawings, Figure 1 is an end elevation of a bolt provided with my improved nut-lock, illustrating a lock to the lock. Fig. 2 is a side elevation of the same, partly in section.

As shown in said drawings, A indicates a threaded bolt of any desired kind. Said screw-threaded end of the bolt is split diametrically and longitudinally and a threaded tapering axial aperture is provided therein.

B indicates the nut provided with internal screw-threads complemental to the screw-threads in the bolt A.

C indicates a tapering stud-bolt provided with screw-threads complemental to the screw-threads in the tapered aperture in the end of the bolt and provided at its outer end with an angular head. The diameter of the screw-threaded part of the said stud-bolt C is slightly greater than the aperture in the end of the bolt A, so that when said stud-bolt is screwed therein it acts as a wedge and spreads or dilates the end of the bolt A to a slightly oval form, with the effect of jamming or wedging the nut B in position on the bolt. Preferably if the bolt A is provided with a right-hand thread the bolt C will be provided with a left-hand thread, so that any cause which would act to unscrew the nut B from the bolt A would serve to proportionately tighten said stud-bolt in its seat, thereby more effectually wedging the nut B in position.

D indicates a locking-plate provided centrally with an angular aperture adapted to receive the head of the stud-bolt C. The plate D is extended on one side and provided with an aperture to receive a bolt E, which is passed through the aperture in the plate when the same is in position on the head of the stud-bolt and has screw-threaded engagement in an aperture in the nut B, as indicated in Fig. 2. Obviously, if preferred, said plate D may be made integral with said bolt C.

Obviously details of construction may be varied without departing from the principle of my invention.

I claim as my invention—

1. The combination with a bolt having its screw-threaded end longitudinally slit provided in the end of the same with an axially-tapering socket, said socket having a screw-thread of opposite lead from the screw-thread of the bolt, a stud-bolt having a screw-thread complemental to the screw-threads of said socket and of slightly greater diameter than said socket and adapted when screwed into the same to expand the end of the bolt into binding engagement with a nut secured thereon and a part rigidly secured on the stud-bolt and adapted to be rigidly secured to said nut.

2. The combination with a screw-threaded bolt having the screw-threaded end thereof slit diametrically and provided axially with a tapering screw-threaded socket, a stud-bolt complemental to the tapering socket in the end of the bolt and of slightly greater diameter and provided with a head adapted for engagement by a wrench or the like and a plate adapted to be secured on said head and provided on one side with an aperture and a locking-pin adapted to be passed through said aperture in the plate and to engage in an aperture in the nut.

3. The combination with a screw-threaded bolt having the screw-threaded end thereof slit diametrically and provided axially with a tapering socket, internal screw-threads in said socket having a lead opposite from the lead of the screw-threads on the bolt, a nut on said bolt, a stud-bolt complemental to the tapering socket in the end of the bolt and of slightly greater diameter and provided with a head adapted for engagement with a wrench or the like, a plate secured on said head and having an aperture in one of its margins, and a screw-threaded locking-bolt adapted to be passed through said aperture and to have screw-threaded engagement with an aperture in said nut.

In testimony whereof I have hereunto subscribed my name in the presence of two subscribing witnesses.

JOHN W. FLETCHER.

Witnesses:
NAFTALY NEWMAN,
C. W. HILLS.